(12) United States Patent
Lyon (10) Patent No.: US 11,444,689 B2
(45) Date of Patent: Sep. 13, 2022

(54) SYSTEMS AND METHODS FOR DETECTING OPTICAL NETWORK CONDITIONS BASED ON SIGNAL LOSS

(71) Applicant: ADTRAN, Inc., Huntsville, AL (US)

(72) Inventor: Jeremy Craig Lyon, Harvest, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 17/170,220

(22) Filed: Feb. 8, 2021

(65) Prior Publication Data

US 2022/0255621 A1 Aug. 11, 2022

(51) Int. Cl.
*H04B 10/08* (2006.01)
*H04B 10/079* (2013.01)

(52) U.S. Cl.
CPC ............ *H04B 10/0791* (2013.01); *H04B 10/07955* (2013.01)

(58) Field of Classification Search
CPC .......... H04B 10/0791; H04B 10/07955; H04B 10/0771; H04B 10/071; H04B 10/27; H04B 10/40; H04B 10/0795; H04B 10/07953; H04B 10/2507; H04J 14/02; H04J 14/0238
USPC ........ 398/66, 67, 68, 69, 70, 71, 72, 79, 33, 398/38, 10, 13, 17, 20, 25, 26, 27, 135, 398/136, 28, 158, 159, 100
See application file for complete search history.

(56) References Cited

U.S. PATENT DOCUMENTS

| | | | | |
|---|---|---|---|---|
| 9,246,582 | B2* | 1/2016 | Fargano | H04B 10/0791 |
| 2009/0269053 | A1* | 10/2009 | Yang | H04Q 11/0067 |
| | | | | 398/22 |
| 2010/0150546 | A1* | 6/2010 | Shrikhande | H04J 14/0282 |
| | | | | 398/10 |
| 2014/0056582 | A1* | 2/2014 | Roberts | H04B 10/07955 |
| | | | | 398/20 |

* cited by examiner

*Primary Examiner* — Hanh Phan
(74) *Attorney, Agent, or Firm* — Maynard Cooper & Gale, P. C.; Jon E. Holland (57) ABSTRACT

A system for detecting an optical network condition, such as a fiber bend, has an optical line terminal (OLT) that is configured to communicate control information with optical network terminals (ONTs) indicating the transmit power levels and the receive power levels of optical signals, such as optical data signals, that are communicated between the OLT and the ONTs. Based on such information, line losses at different wavelengths are determined and then compared in order to detect an optical network condition, such as a fiber bend. Since the measurements can be performed on optical data signals ordinarily communicated between the OLT and the ONTs, the testing may be performed during data communication. Further, as long as optical communication between the OLT and the ONTs is possible, a fiber bend or other network condition may be detected at any point along the optical path.

17 Claims, 4 Drawing Sheets

SYSTEMS AND METHODS FOR DETECTING OPTICAL NETWORK CONDITIONS BASED ON SIGNAL LOSS

RELATED ART

Passive optical networks (PONs) are used extensively in telecommunication systems to provide high-speed optical communications between an optical line terminal (OLT) and a plurality of optical network terminals (ONTs). Communication performance can be adversely affected by line anomalies between the OLT and ONTs, such as degraded splices and fiber bends. A fiber bend generally refers to a bend in an optical fiber that introduces significant losses in the optical signals passing through the fiber, thereby degrading communication performance. A fiber bend has a characteristic of attenuating optical signals at higher wavelengths to a greater extent relative to signals at a lower wavelength. A degraded splice has a characteristic of reflecting a relatively large amount of optical power relative to other points along the fiber, and the amount of reflection typically fluctuates over time.

Optical time domain reflectometers (OTDRs) have typically been used to detect the presence and locations of line anomalies, including degraded splices and fiber bends. An OTDR transmits an optical test signal through a fiber under test and measures the reflections of the test signal as it propagates along the fiber. These reflections are measured and accumulated over time to enable detection of line anomalies. For many OTDR designs, data communication through the fiber is not possible while the fiber is connected to and under evaluation by the OTDR. That is, testing of the fiber by the OTDR interrupts or otherwise prevents data communication between the OLT and ONTs such that continuous testing of the fiber during data communication is not possible.

Some OTDRs have been designed to embed the OTDR test signal in an optical data signal that is communicated between the OLT and ONTs, thereby enabling continuous testing of the optical fiber during data communication. However, the transmit power of the embedded test signal is usually kept small, such as less than about 10% of the transmit power of the optical data signal, so as to limit adverse effects of the test signal to communication performance. Thus, the range of such an OTDR is typically more limited than the range of other types of OTDRs that operate at higher transmit powers but interrupt data communication. Indeed, OTDRs that embed an OTDR test signal within an optical data signal often have difficulty seeing past a splitter, which reflects a relatively significant amount of power compared to other points along an optical path. Therefore, anomalies past a splitter or a significant distance from the OTDR may be undetectable.

Thus, a heretofore unaddressed need exists in the art for improved techniques of detecting line anomalies in optical networks.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for detecting optical network conditions based on signal loss. A system in accordance with some embodiments of the present disclosure has an optical line terminal (OLT) that is configured to communicate control information with optical network terminals (ONTs) indicating the transmit power levels and the receive power levels of optical signals, such as optical data signals, that are communicated between the OLT and the ONTs. Based on such information, line losses at different wavelengths are calculated or otherwise determined and then compared in order to detect the presence of a network condition, such as a fiber bend, in the optical path between the OLT and at least one ONT. Since the measurements can be performed on optical data signals ordinarily communicated between the OLT and the ONTs, the testing may be performed during data communication and, thus, may be continuous without adversely affecting communication performance. In addition, as long as optical communication between the OLT and the ONTs is possible, a fiber bend or other network condition may be detected at any point along the optical path regardless of its distance from the OLT or its location relative to splitters along the optical path.

Figure 1:
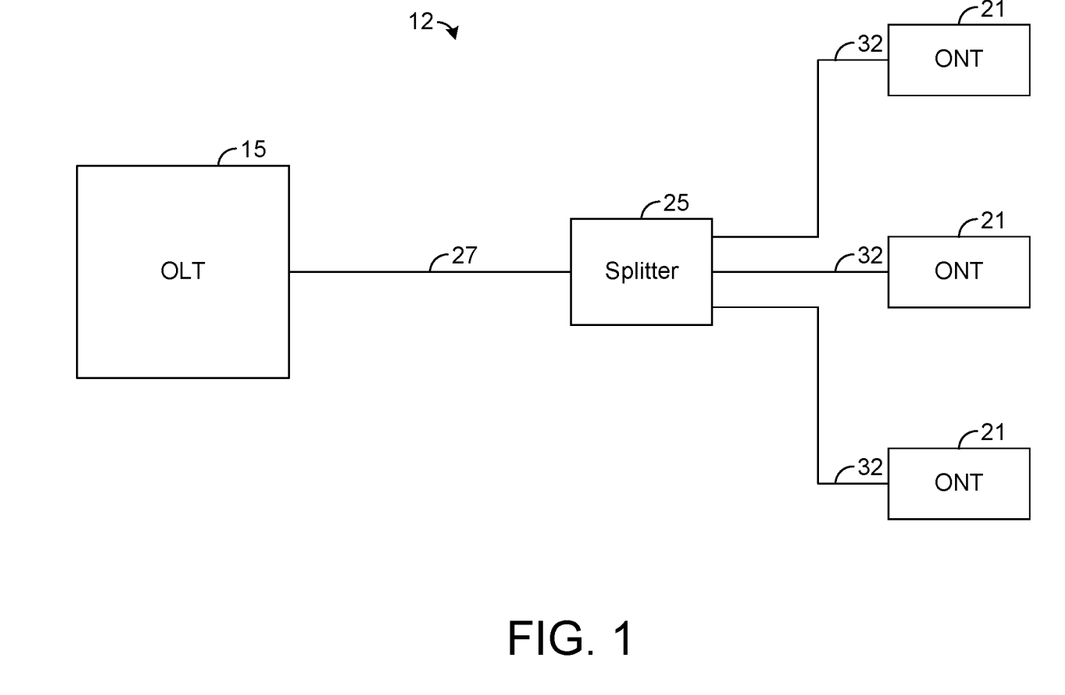
FIG. 1 is a block diagram illustrating an exemplary embodiment of an optical network.

FIG. 1 depicts an exemplary embodiment of an optical network 12. In some embodiments, the network 12 of FIG. 1 is a passive optical network (PON), but other types of optical networks are possible in other embodiments. As shown by FIG. 1, the optical network 12 has an optical line terminal (OLT) 15 that is optically coupled to a plurality of optical network terminals (ONTs) 21. In this regard, the OLT 15 is coupled to an optical splitter 25 by at least one optical fiber 27, and the splitter 25 is coupled to the ONTs 21 by optical fibers 32. As an example, the optical network 12 may form part of a telecommunication system where the OLT 15 is positioned at a central office of a telecommunication network or an intermediate point between the central office and a plurality of customer premises. Each ONT 21 may be positioned at or near a respective customer premises. However, other locations of the OLT 15 and ONTs 21 and other uses of the optical network 12 are possible in other embodiments.

In the downstream direction, the OLT 15 is configured to receive data to be transmitted to the ONTs 21. As an example, the OLT 15 may receive data from a network (not shown in FIG. 1), such as the Internet or some other type of network for communicating data. The OLT 15 is further configured to encapsulate the data in accordance with the optical protocol of the network 12 and to transmit frames containing such data via at least one optical signal through the optical fiber 27 connected to the OLT 15. An optical data signal carrying frames from the OLT 15 is split by the splitter 25 so that is received by each of the ONTs 21. Each ONT 21 extracts the transmitted downstream data from the received frames and transmits the data, as appropriate, further downstream, such as to customer premises equipment (CPE) (not shown in FIG. 1) at a one more customer premises or other types of communication devices.

In the upstream direction, each ONT 21 receives data to be communicated to the OLT 15. As an example, an ONT 21 may receive data from CPE at one or more customer premises or other communication devices. The ONT 21 is further configured to encapsulate the data in accordance with the optical protocol of the network 12 and to transmit such data via at least one optical data signal through the optical fiber 32 connected to the ONT 21. The optical signals transmitted by the ONTs 21 pass through the splitter 25 and the optical fiber 27 and are received by the OLT 15. The OLT 15 extracts the transmitted upstream data and transmits the data, as appropriate, further upstream, such as to a network (e.g., the Internet or other type of network).

In some embodiments, the downstream signal transmitted by the OLT 15 is at a different wavelength than the wavelength or wavelengths of the upstream signals transmitted by the ONTs 21. As an example, in a Gigabit-capable PON (GPON), optical signals are typically transmitted downstream at about 1490 nanometers (nm), and optical signals are typically transmitted upstream at about 1550 nm. In 10-Gigabit-capable Symmetric PON (XGS-PON), optical signals are typically transmitted downstream at about 1577 nanometers (nm), and optical signals are typically transmitted upstream at about 1270 nm.

In some embodiments, each ONT 21 transmits at the same wavelength, and communication in the upstream direction is time-division multiplexed, under the control of the OLT 15, so as to prevent interference between the transmissions of the ONTs 21. In this regard, the OLT 15 may communicate with the ONTs 21 via a control channel of the optical protocol of the network 12 and assign each ONT 21 with timeslots in which to transmit in the upstream direction. In other embodiments, other techniques for communicating between the OLT 15 and ONTs 21 are possible. As an example, it is possible for the ONTs 21 to transmit in the upstream direction at different wavelengths (i.e., wavelength-division multiplexing) such that time-division multiplexing between the ONTs 21 is unnecessary.

Figure 2:
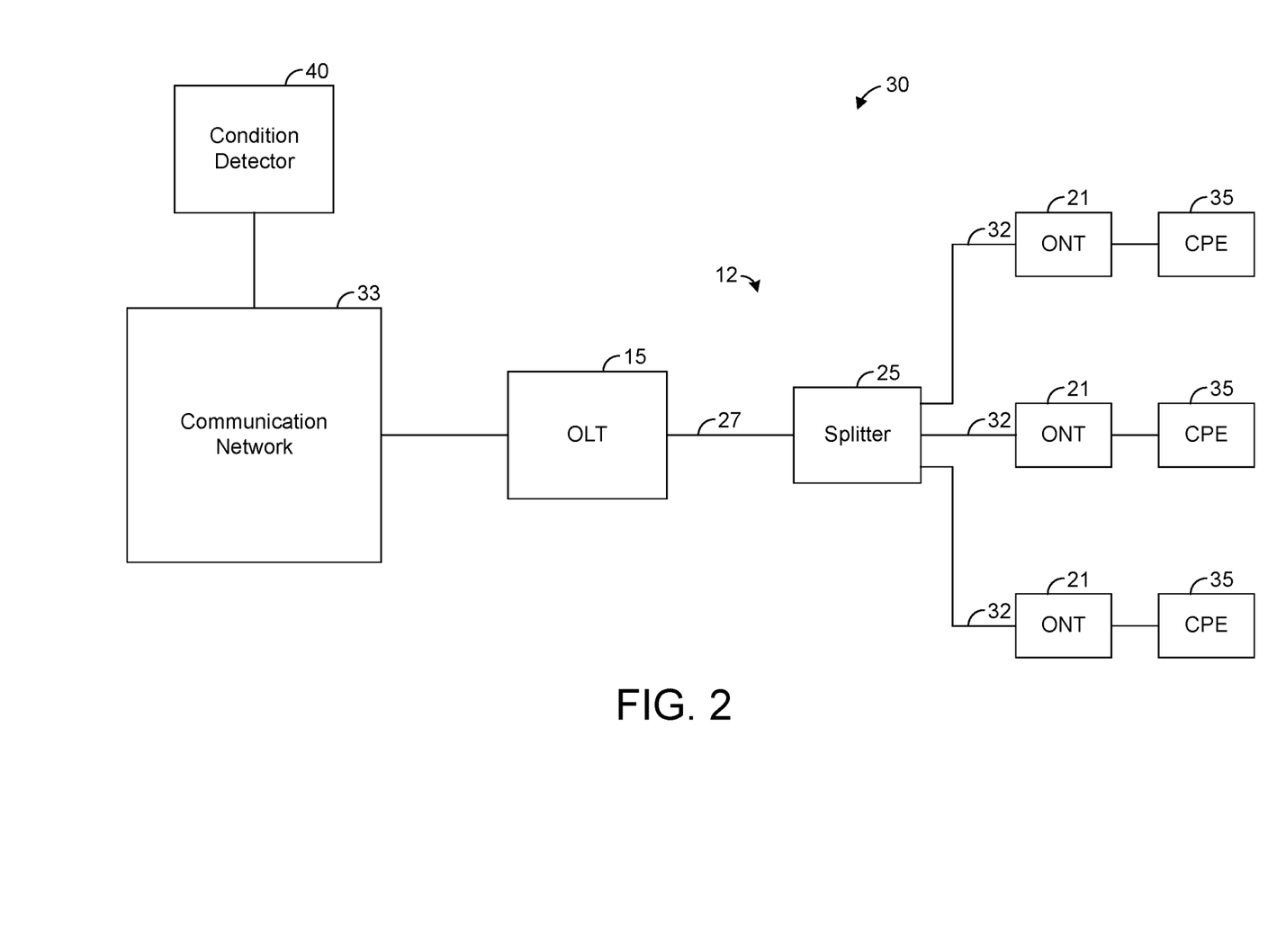
FIG. 2 is a block diagram illustrating an exemplary embodiment of a communication system using an optical network, such as is depicted by FIG. 1.

FIG. 2 depicts a communication system 30 that is configured to detect various conditions (e.g., fiber bends) in an optical network 12. As shown by FIG. 2, the optical network 12 is coupled between a communication network 33 (e.g., the Internet, public switched telephone network (PSTN), or other type of network) and customer premises equipment 35 located at a plurality of customer premises. The system 30 also has a condition detector 40 that is coupled to the network 33 and configured to communicate with the OLT 15 and/or ONTs 21 through the network 33, as will be described in more detail below. In other embodiments, the condition detector 40 or portions of the condition detector 40 may reside at other locations. As an example, the condition detector 40 or a portion of the condition detector 40 may be coupled to or integrated with the OLT 15 or reside at the same premises as the OLT 15 such that communication between the condition detector 40 and the OLT 15 through the network 33 is unnecessary.

For illustrative purposes, the condition detector 40 will be described hereafter as being configured to detect fiber bends in the optical network 12 unless otherwise indicated. However, as will be described in more detail below, the condition detector 40 may be configured to use similar techniques to detect other types of network conditions (e.g., other types of line anomalies).

Figure 3:
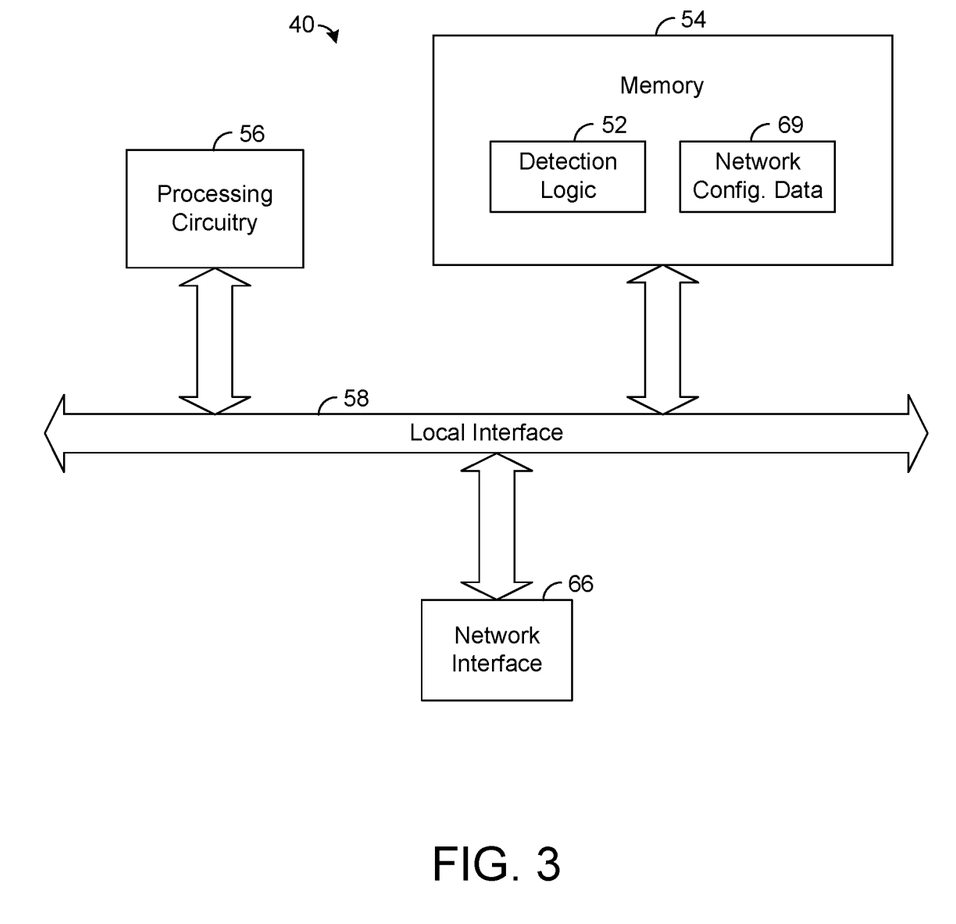
FIG. 3 is a block diagram illustrating an exemplary embodiment of a condition detector, such as is depicted by FIG. 2.

FIG. 3 depicts an exemplary embodiment of the condition detector 40. As shown by FIG. 3, the condition detector 40 comprises detection logic 52 for generally controlling the operation of the condition detector 40, including detecting fiber bends, as will be described in more detail hereafter. The detection logic 52 can be implemented in software, hardware, firmware or any combination thereof. In the condition detector 40 illustrated by FIG. 3, the detection logic 52 is implemented in software and stored in memory 54.

Note that the detection logic 52, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary condition detector 40 depicted by FIG. 3 comprises processing circuitry 56 (e.g., at least one conventional processor, such as a digital signal processor (DSP) or a central processing unit (CPU)) that communicates to and drives the other elements within the condition detector 40 via a local interface 58, which can include at least one bus. Further, a network interface 66, such as at least one modem, may be used to exchange data with the network 33 (FIG. 2). In addition, as shown by FIG. 3, the memory 54 may store data 69, referred to hereafter as "network configuration data," indicative of the configuration of the optical network 12, as will be described in more detail below.

In some embodiments, the condition detector 40 may be configured to share resources with other components of the system 12. As an example, if the condition detector 40 is integrated with the OLT 15, the processing circuitry 56 and memory 54 may be used by components of the OLT 15 to perform functions of the OLT 15.

In some embodiments, the condition detector 40 is configured to receive information indicative of the communication performance of optical signals of different wavelengths transmitted through the optical network 12 and, based on a comparison of such performances, identify a fiber bend within the optical network 12. As an example, as described above, a fiber bend has a disproportionate effect on optical signals depending on wavelength. That is, a fiber bend typically attenuates optical signals of a higher wavelength to a greater extent than optical signals of a lower wavelength. If the condition detector 40 determines that a difference in the communication performances of different optical signals of different wavelengths passing through the same optical path is greater than a predefined amount, then the condition detector 40 may detect the presence of a fiber bend in the optical path.

Note that there are various ways that the condition detector 40 may assess the relative communication performance of optical signals. As an example, there are some well-known parameters or metrics, such as signal-to-noise ratio or error rate, that may be used to assess communication performance. Such parameters may be used (e.g., compared) by the condition detector 40 to detect fiber bends. In other embodiments, for each optical signal of at least two optical signals of different wavelengths, the condition detector 40 is configured to calculate a value indicative of an amount of signal loss incurred by the optical signal as it travels through an optical path and then compare the calculated values in order to determine whether a fiber bend is present in the optical path. To help illustrate concepts of the present disclosure in more detail, exemplary techniques for detecting a fiber bend using values indicative of signal loss will be described in more detail below. However, it should be emphasized that other types of values indicative of communication performance, such as signal-to-noise ratio or error rate, may be used in other embodiments.

As noted above, the downstream optical data signal transmitted by the OLT 15 through the optical network 12 is often at a different wavelength than the wavelength of the upstream optical data signals transmitted by the ONTs 21. In some embodiments, the condition detector 40 is configured to compare the communication performance of a downstream signal from the OLT 15 to the communication performance of at least one upstream signal and to detect a presence of a fiber bend based on such comparison, as will be described in more detail below.

In this regard, the OLT 15 may be configured to collect or otherwise determine information indicative of the communication performances of the downstream signal from the OLT 15 and the upstream signal from at least one ONT 21, and transmit such information through the communication network 33 or otherwise to the condition detector 40. For simplicity of illustration, an exemplary process will be described for collecting information from a single ONT 21 in order enable evaluation of whether a fiber bend exists between the OLT 15 and the ONT 21. However, it is possible for a similar evaluation to be performed between the OLT 15 and any number of ONTs 21 so that a fiber bend may be detected at any point in the network using the techniques described herein. In some embodiments, the performance information collected or otherwise determined by the OLT 15 is indicative of transmit and receive power levels of the downstream and upstream signals communicated by the OLT 15 and ONT 21, as will be described in more detail below, but it should emphasized that other types of performance information may be used in other embodiments.

In this regard, the OLT 15 may be configured to measure or otherwise determine the transmit power level or, in other words, the amplitude of the downstream signal at the time of transmission by the OLT 15 through the optical fiber 27. The OLT 15 may also be configured to measure or otherwise determine the receive power level or, in other words, the amplitude of an upstream signal at the time of reception by the OLT 15 from the optical fiber 27. The ONT 21 that transmitted such upstream signal may be similarly configured to measure or otherwise determine the transmit power level or, in other words, the amplitude of this upstream signal at the time of transmission by the ONT 21, and the ONT 21 may also be configured to measure or otherwise determine the receive power level or, in other words, the amplitude of the downstream signal at the time of reception by the ONT 21. In some embodiments, the OLT 15 is configured to receive from the ONT 21 parameters measured or otherwise determined by the ONT 21, such as the transmit power of the upstream signal and the receive power of the downstream signal. As an example, a control channel within the optical protocol used for communication between the OLT 15 and ONT 21 may be used to convey such information from the ONT 21 to the OLT 15, though other techniques may be used to convey performance information to the OLT 15 in other embodiments. The OLT 15 may transmit to the condition detector 40 information indicative of the communication performances of the downstream and upstream signals, such as the transmit and receive power levels described above.

The condition detector 40 is configured to receive the performance information and to analyze the performance information to detect whether a fiber bend is present in the optical path between the OLT 15 and ONT 21. In some embodiments, the condition detector 40 is configured to calculate or otherwise determine a value, referred to hereafter as "$DS_{loss}$," indicative of an amount of signal loss in the downstream signal and a value, referred to hereafter as "$US_{loss}$," indicative of an amount of signal loss in the upstream signal. As an example, $DS_{loss}$ may be calculated by subtracting the receive power of the downstream signal measured or otherwise determined by the ONT 21 from the transmit power of the downstream signal measured or otherwise determined by the OLT 15, and $US_{loss}$ may be calculated by subtracting the receive power of the upstream signal measured or otherwise determined by the OLT 15 from the transmit power of the upstream signal measured or otherwise determined by the ONT 21.

Notably, the downstream signal measured by a particular ONT 15 travels the same optical path (but in the reverse direction) as the upstream signal received by the OLT 15 from this same ONT 15. Thus, it is generally expected that the losses incurred by such signals will be about the same, and a significant difference in the upstream loss relative to the downstream loss may indicate the presence of a fiber bend in the optical path between the OLT 15 and the ONT 21. In this regard, as noted above, a fiber bend attenuates signals at a higher wavelength greater than signals at a lower wavelength, so a fiber bend may be present when there is a significant difference in signal loss between two signals communicated at different wavelengths. In some embodiments, the condition detector 40 determines whether there is a significant difference in signal loss between two signals of different wavelengths by comparing $DS_{loss}$ and $US_{loss}$. As an example, the condition detector 40 may be configured to subtract $DS_{loss}$ and $US_{loss}$ and detect the presence of a fiber bend between the OLT 15 and the ONT 21 if the difference is greater than a predefined threshold.

Note that at least some of the processing or calculations described above may be performed at different locations. As an example, rather than transmitting information including the receive and transmit powers through the network 33 to the condition detector 33 shown by FIG. 2, a portion of the detection logic 52 may be implemented at the OLT 15 to calculate $DS_{loss}$ and $US_{loss}$, and transmit these parameters through the network 33 to the condition detector 40 shown by FIG. 2 for evaluation. In fact, it is possible for the evaluation to also be performed at the OLT 15, such as when the condition detector 40 is embedded in or integrated with the OLT 15. However, locating the condition detector 40 at a remote location from the OLT 15, as shown by FIG. 2 may be desirable to facilitate monitoring of multiple optical networks by the condition detector 40. That is, the condition detector 40 may reside at a central location for communicating with the OLTs 15 or other components of a multitude of optical networks 12 for the purpose of monitoring such networks 12 for fiber bends, as described herein for the optical network 12 shown by FIG. 2.

In some embodiments, more accurate results might be obtained if $DS_{loss}$ and $US_{loss}$ are adjusted to account for expected losses in the optical path. In this regard, in normal optical communication in the absence of fiber bends, it is expected that an optical signal will be attenuated as it propagates through an optical fiber. Generally, the amount of loss is proportional to distance such that a signal is attenuated to a greater extent for greater distances of propagation through the fiber. In addition, it is also expected that a signal will experience a greater amount of loss as it passes through various components of the optical path, such as a splitter.

The condition detector 40 may be configured to determine an amount of loss that is expected between the OLT 15 and the ONT 21 based on the configuration of the optical network 12 and adjust the loss parameters (e.g., $DS_{loss}$ and $US_{loss}$) based on the expected loss. As an example, the condition detector 40 may be configured to determine an amount of loss that is expected based on a distance between the OLT 15 and the ONT 21 and also the amount of loss that is expected based on a number of optical splitters 25 in the data path between the OLT 15 and the ONT 21. The condition detector 40 may then adjust $DS_{loss}$ and $US_{loss}$ to account for these expected losses such that $DS_{loss}$ and $US_{loss}$, as adjusted, represent the amount of "unexplained" or, in other words, unknown loss in the downstream signal and the upstream signal, respectively.

As an example, based on the transmit power of the OLT 15 and the distance between the OLT 15 and the ONT 21, the condition detector 40 may be configured to calculate an expected amount of downstream loss, $L_{DS1}$. Note that the condition detector 40 may assume that the fiber in the network 12 attenuates the downstream signal by a predefined amount or ratio per unit of distance. In addition, based on the number of optical splitters 25 in the optical path between the OLT 15 and the ONT 21, the condition detector 40 may be configured to calculate an expected amount of downstream loss, $L_{DS2}$, attributable to the presence of the optical splitters 25. Note that the condition detector 40 may assume that each splitter 25 attenuates a signal by a predefined amount or ratio. After calculating $L_{DS1}$ and $L_{DS2}$, the condition detector 40 may subtract these values from $DS_{loss}$ thereby adjusting $DS_{loss}$ to indicate the amount of unexplained loss in the downstream signal. That is, the amount of downstream unexplained loss, $DS_{unexplained}$, may be calculated according to the following equation.

$$DS_{unexplained} = DS_{loss} - L_{DS1} - L_{DS2} \quad (1)$$

In addition, the condition detector 40 may similarly calculate the expected losses in the upstream direction and adjust $US_{loss}$. Specifically, based on the transmit power of the ONT 21 and the distance between the OLT 15 and the ONT 21, the condition detector 40 may be configured to calculate an expected amount of upstream loss, $L_{US1}$. In addition, based on the number of optical splitters 25 in the optical path between the OLT 15 and the ONT 21, the condition detector 40 may be configured to calculate an expected amount of upstream loss, $L_{US2}$, attributable to the presence of the optical splitters 25. After calculating $L_{US1}$ and $L_{US2}$, the condition detector 40 may subtract these values from $US_{loss}$ thereby adjusting $US_{loss}$ to indicate the amount of unexplained loss in the downstream signal. That is, the amount of downstream unexplained loss, $US_{unexplained}$, may be calculated according to the following equation.

$$US_{unexplained} = US_{loss} - L_{US1} - L_{US2} \quad (2)$$

Note that, if the transmit power of the OLT 15 and the ONT 21 are the same, then it is generally expected that $US_{unexplained}$ should be approximately equal to $DS_{unexplained}$. Assuming that the transmit powers of the OLT 15 and the ONT 21 are, in fact, the same, the condition detector 40 may be configured to detect a fiber bend if the following equation is satisfied:

$$DS_{unexplained} - US_{unexplained} > Th \quad (3)$$

where TH is a predefined threshold. As an example, a threshold of around 6 to 8 decibels (dB) may be used, although other thresholds may be used in other embodiments. If the above Equation (3) is not satisfied, then the condition detector 40 may determine that no fiber bends exist in the optical path between the OLT 15 and the ONT 21. Note that if there is a significant difference in the upstream transmit power and the downstream transmit power, then Equation (3) may be normalized or otherwise adjusted to account for the difference in transmit powers.

It should be noted that various techniques may be used to determine the distance between the OLT 15 and the ONT 21 and the number of splitters 25 between the OLT 15 and the ONT 21 for use in calculating the parameters described above. As an example, in one embodiment, such information may be predetermined and included as part of the network configuration data 69 (FIG. 3) stored in the memory 54 of the condition detector 40. In this regard, the network configuration data 69 may generally include information indicating the configuration of the network 12, including the distances between components and the layout of the network 12, such as the number of splitters 25 and the connectivity between components. As an example, the network configuration data 69 may identify each splitter 25 of the network 12 and indicate which of the ONTs 21 are optically connected to each splitter 25. That is, the data 69 may indicate the topology of the optical network 32. In some cases, the topology of the optical network 12 may be predetermined. In other embodiments, the condition detector 40 may be configured to infer or otherwise determine at least some of the topology information based on information from the OLT 15 or other components of the system.

In some embodiments, for a given ONT 21, the detection logic 52 of the condition detector 40 may use the network configuration data 69 to look up or otherwise retrieve the distance of the ONT 21 from the OLT 15 and the number of splitters 25 in the optical path from the OLT 15 to the ONT 21. Alternatively, the amount of expected loss between the OLT 15 and the ONT 21 in each direction may be predetermined and stored in the network configuration data 69 such that the condition detector 40 may calculate the unexplained loss in a given direction by subtracting the expected loss indicated by the data 69 from the measured loss (e.g., the difference in the measured transmit power and the measured receive power for the given direction). Various other techniques for enabling the condition detector 40 determine an expected amount of loss in a given direction are possible.

In some embodiments, the condition detector 40 may be configured to determine a location of a detected fiber bend based on information associated with multiple ONTs 21. As an example, using the techniques described above for determining whether a fiber bend exists between the OLT 15 and a given ONT 21, the condition detector 40 may similarly evaluate whether a fiber bend exists between the OLT 15 and each of a plurality of ONTs 21, such as each ONT 21 of the optical network 12. Based on which of the ONTs 21 are associated with a detection of a fiber bend, the condition detector 40 may isolate a portion of the network 12 in which the fiber bend likely exists. As an example, if a fiber bend is detected for only a subset of the ONTs 21 of the network 12, then it may be assumed that the fiber bend exists in a portion of the network 12 for which each such ONT 21 shares the same optical path to the OLT 15.

Figure 4:
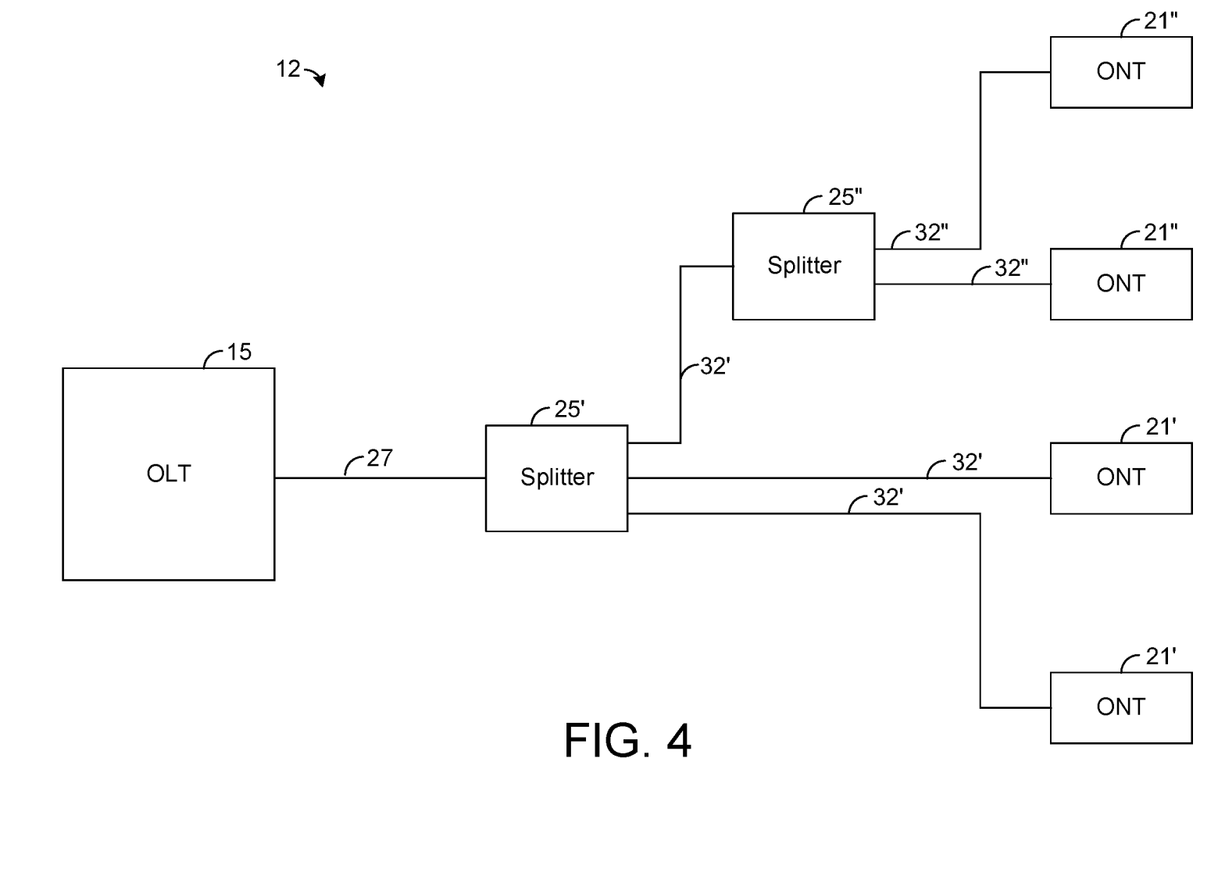
FIG. 4 is a block diagram illustrating an exemplary embodiment of an optical network.

To better illustrate the foregoing, assume that the optical network 12 has a configuration as shown by FIG. 4. In this regard, the network 12 has four ONTs 21', 21" that are all optically coupled to the OLT 15 through a splitter 25. In addition, two ONTs 21" are coupled to the splitter 25' through another splitter 25", as shown by FIG. 4. Thus, the optical fiber 27 is shared by all four ONTs 21', 21", and one of the optical fibers 32' between the splitter 25' and the splitter 25" is shared by two ONTs 21".

For each of the four ONTs 21', 21", the condition detector 40 may be configured to evaluate whether a fiber bend exists between the OLT 15 and the respective ONT 21', 21" under test. If the condition detector 40 detects a fiber bend for each of the four ONTs 21', 21", then the condition detector 40 may determine that a fiber bend likely exists in the fiber 27 since it is the only fiber of the network 12 shared by all of the ONTs 21', 21" associated with the detected bend. However, if the condition detector 40 detects a fiber bend for each of the two ONTs 21" only, then the condition detector 40 may determine that the fiber bend is not in the fiber 27 since the ONTs 21' share the fiber 27 but are not associated with the fiber bend (i.e., a fiber bend is not detected for the ONTs 21). In such a case, the condition detector 40 may determine that the detected fiber bend is likely in the fiber 32' between the splitter 25' and the splitter 25" since it is the only fiber shared by all of the ONTs 21" associated with the detected bend.

If a fiber bend is detected for only one ONT, then the condition detector 40 may determine that the detected bend is in the fiber that extends to such ONT. As an example, if a fiber bend is detected for only one of the ONTs 21", then the condition detector 40 may determine that the detected bend is in the fiber 32" extending from that ONT 21" to the splitter 25". Alternatively, if a fiber bend is detected for only one of the ONTs 21', then the condition detector 40 may determine that the detected bend is in the fiber 32' extending from that ONT 21' to the splitter 25'. In other embodiments, other techniques for isolating a detected fiber bend to a specific fiber or other portion of the network 12 are possible.

Once a fiber bend is detected, the condition detector 40 may be configured to perform one or more actions as may be desired, such as notifying one or more users of the detected fiber bend. As an example, in response to a detection of a fiber bend, the condition detector 40 may transmit a message, such as an email message or other type of message, to a user (e.g., a technician or other user) who may then take action for correcting the fiber bend. The message preferably includes information that may be used to determine the approximate location of the fiber bend. As an example, the message may include an identifier that identifies the optical network 12 in which the detected fiber bend is located. The message may also indicate which portion of the optical network 12 is determined to have the fiber bend. As an example, if the condition detector 40 is able to isolate the fiber bend to a particular optical fiber or after a particular splitter, the message may identify such fiber or splitter. The technician may use this information either to identify the fiber having the bend or to facilitate diagnostic efforts to find the fiber bend. As an example, if the condition detector 40 can determine that the fiber bend is after a particular splitter (e.g., between the splitter and one or more ONTs), then a technician may travel to the premises of the splitter and use an OTDR to test various fibers connected to the splitter in order to locate the fiber bend 40. In other embodiments, other actions may be taken in response to a detection of a fiber bend.

In some embodiments, upon detecting a fiber bend, the condition detector 40 may be configured to evaluate the effects of the bend on communication performance before deciding the type of action to take. If the effect of the bend on communication performance is not significant, then the condition detector 40 may refrain from taking an action (e.g., transmission of a particular message) that would otherwise trigger a truck roll or other type of action to correct the fiber bend.

As an example, upon detecting a fiber bend, the condition detector 40 may identify which ONTs 21 are affected by the bend (e.g., which ONTs 21 are downstream of the bend such that they receive the downstream signal through the detected fiber bend). For example, if the fiber bend is determined to be within the optical fiber 32' between the splitter 25' and the splitter 25" of FIG. 4, then the condition detector 40 may identify the two ONTs 21" downstream of the bend as being affected. The condition detector 40 may then analyze the receive power measured by the affected ONTs 21" (noting that such information may be reported to the condition detector 40 for enabling the detection of fiber bends, as described above) to determine whether the receive power of each affected ONT 21" is above a predefined threshold. The condition detector 40 may also determine if the receive power measured by the OLT 15 from the each of the affected ONTs 21 is also above a predefined threshold.

If all of the measured receive powers of the OLT 15 and the affected ONTs 21" are above their respective thresholds, then it may be determined that the effect of the fiber bend on communication performance is not sufficiently great to justify the costs of a truck roll to correct the fiber bend. In such case, the condition detector 40 may be configured to log the fiber bend or report the fiber bend without transmitting a message (e.g., a work order) that might trigger a truck roll to correct the fiber bend. However, if any of the measured receive powers is below its respective threshold, then the condition detector 40 may be configured to transmit a particular message (e.g., a work order) that causes a technician or other user to find and correct the detected fiber bend.

In other embodiments, other techniques for assessing the communication performance of the network 12 for the affected ONTs 21" are possible. As an example, the OLT 15 may be configured to report an error rate or signal-to-noise ratio for the communication between the OLT 15 and an affected ONT 21". If the error rate is below a predefined threshold or the signal-to-noise ratio is above a predefined threshold, then the condition detector 40 may determine that a particular action, such as sending a message for triggering a truck roll, is unnecessary.

Note that a receive or transmit power measurement reported to the condition detector 40 or otherwise used to detect a fiber bend can be an average or other combination of measurements to provide a measurement value that provides a better assessment of the transmit or receive power over time relative to an instantaneous power measurement that may be associated with a significant amount of error. That is, by averaging or otherwise combining power measurements, the effects of measurement errors can be smoothed over time such that the measurement value reported to the condition detector 40 is likely more accurate than an instantaneous measurement.

In addition, it should also be noted that it is unnecessary for signals used for detecting a fiber bend to be transmitted through the optical network 12 in opposite directions. In this regard, the downstream signal and upstream signal in an optical network are often communicated at different wavelengths, as described above, and thus may be used to detect a fiber bend. However, it is also possible for optical signals traveling in the same direction through the same optical path to be at different wavelengths and the communication performance of such signals may be similarly compared to detect a fiber bend.

As an example, in a Wavelength Division Multiplexing-Passive Optical Network (WDM-PON), multiple downstream signals at different wavelengths are transmitted through the WDM-PON by one or more OLTs and multiple upstream signals at different wavelengths are transmitted through the WDM-PON by multiple ONTs. A value indicative of communication performance for one such signal may be compared to the communication performance of another such signal at a different wavelength to detect a presence of a fiber bend even if the two signals are in the same direction. As an example, the unexplained loss of one downstream signal may be subtracted from the unexplained loss of another downstream signal, and the difference may be compared to a threshold, as described by Equation (3) above, to determine whether a fiber bend exists in the WDM-PON.

In various embodiments described above, the condition detector 40 is described as detecting fiber bends in the optical network 12. However, as noted above, the condition detector 40 may be configured to use the same or similar equations and/or techniques described above in order to detect other types of network conditions.

As an example, in an optical network (not shown) having a faulty repeater between the OLT and at least one ONT, it is possible that the repeater may transmit at a much higher or lower power than normal in one of the directions. Using techniques similar to those described above, the condition detector 40 may detect when the difference in power downstream and upstream is greater than expected due to a faulty repeater.

In addition, a faulty ONT, sometimes referred to as a "rogue ONT," may transmit upstream during frames scheduled for other ONTs. Such a rogue ONT interferes with upstream signals from other ONTs. During such times of interference, there may be a greater than normal amount of upstream energy received by the OLT. Due to this higher amount of upstream energy, the difference in upstream and downstream power may be greater than normal and detectable by the condition detector 40 according to the same or similar techniques described above.

Moreover, when the detector 40 detects that an unusual or unexpected condition exists in the optical path, a technician may be alerted to further investigate the optical path in order to resolve the type of condition resulting in the unusual or unexpected condition. In some cases, the detector 40 may be able to diagnose the type of condition detected. As an example, by using thresholds tailored for the detection of one type of condition (e.g., fiber bends), the detector 40 may be able to distinguish one type of condition (e.g., a fiber bend) from another type of condition (e.g., a rogue ONT).

Accordingly, using the techniques described above, the condition detector 40 may be configured to detect an occurrence of a specific network condition (e.g., a fiber bend or other type of line anomaly) or any of a group of network conditions.

Now, therefore, the following is claimed:

1. A system for detecting optical network conditions based on signal loss, comprising:
    at least one optical line terminal (OLT) of an optical network;
    a plurality of optical network terminals (ONTs) of the optical network, each of the plurality of ONTs optically coupled to the at least one OLT by a plurality of optical fibers; and
    a condition detector configured to:
        receive information indicative of communication performance of the optical network;
        determine, based on the information, a first value indicative of a measured amount of signal loss for a first optical signal transmitted at a first wavelength through the optical network between the at least one OLT and at least one ONT of the plurality of ONTs;
        calculate, based on a distance between the at least one OLT and the at least one ONT, a second value indicative of an expected amount of signal loss between the at least one OLT and the at least one ONT at the first wavelength;
        calculate, based on a difference between the first value and the second value, a third value indicative of a signal loss associated with the first optical signal;
        determine, based on the information, a fourth value indicative of a measured amount of signal loss for a second optical signal transmitted at a second wavelength through the optical network between the at least one OLT and the at least one ONT;
        calculate, based on a distance between the at least one OLT and the at least one ONT, a fifth value indicative of an expected amount of signal loss between the at least one OLT and the at least one ONT at the second wavelength;
        calculate, based on a difference between the fourth value and the fifth value, a sixth value indicative of a signal loss associated with the second optical signal;
        compare the third value to the sixth value; and
        detect a condition in the optical network based on comparison of the third value to the sixth value.

2. The system of claim 1, wherein the condition is a fiber bend.

3. The system of claim 1, further comprising a communication network, wherein the condition detector is configured to communicate with the at least one OLT through the communication network and to receive the information from the at least one OLT via the communication network.

4. The system of claim 1, wherein the condition detector is configured to determine a difference between the third value and the sixth value, and wherein the condition detector is configured to compare the difference to a predefined threshold.

5. The system of claim 1, wherein the condition detector is configured to determine a location of the condition within the optical network based on the comparison.

6. The system of claim 1, wherein the condition detector is configured to determine which of the plurality of ONTs are associated with the condition, and wherein the condition detector is configured to determine a location of the condition within the optical network based on the ONTs determined to be associated with the condition.

7. The system of claim 1, wherein the condition detector is configured to determine at least one optical component in an optical path between the at least one OLT and the at least one ONT and to determine the second value based on the at least one optical component.

8. The system of claim 1, wherein the plurality of ONTs includes at least a first ONT and a second ONT, wherein the first optical signal is transmitted between the at least one OLT and the first ONT, and wherein the second optical signal is transmitted between the at least one OLT and the second ONT.

9. A system for detecting optical network conditions, comprising:
    at least one optical line terminal (OLT) of an optical network;
    a plurality of optical network terminals (ONTs) of the optical network, the plurality of ONTs optically coupled to the at least one OLT by a plurality of optical fibers; and a condition detector configured to:
receive (1) a first value indicative of communication performance for a first optical signal transmitted through the optical network between the OLT and at least one ONT of the plurality of ONTs at a first wavelength, wherein the first value is based on a single measurement of optical attenuation of the first optical signal and (2) a second value indicative of a communication performance of a second optical signal transmitted through the optical network between the OLT and the at least one ONT at a second wavelength, wherein the second value is based on a single measurement of optical attenuation of the second optical signal;
compare the first value and the second value; and
detect a condition in the optical network based on comparison of the first value and the second value.

10. The system of claim 9, wherein the condition is a fiber bend.

11. A method for detecting optical network conditions based on signal loss, comprising:
receiving, with processing circuitry, information indicative of communication performance of an optical network in communicating between at least one optical line terminal (OLT) of the optical network and a plurality of optical network terminals (ONTs) of the optical network, the plurality of ONTs optically coupled to the at least one OLT by a plurality of optical fibers;
determining, with the processing circuitry based on the information, a first value indicative of a measured amount of signal loss for a first optical signal transmitted at a first wavelength through the optical network between the at least one OLT and at least one ONT of the plurality of ONTs;
calculating, based on a distance between the at least one OLT and the at least one ONT, a second value indicative of an expected amount of signal loss between the at least one OLT and the at least one ONT at the first wavelength;
calculating, based on a difference between the first value and the second value, a first third value indicative of a signal loss associated with the first optical signal;
determining, with the processing circuitry based on the information, a fourth value indicative of a measured amount of signal loss for a second optical signal transmitted at a second wavelength through the optical network between the at least one OLT and the at least one ONT;
calculating, with the processing circuitry based on a distance between the at least one OLT and the at least one ONT, a fifth value indicative of an expected amount of signal loss between the at least one OLT and the at least one ONT at the second wavelength;
calculating, with the processing circuitry based on a difference between the fourth value and the fifth value, a sixth value indicative of a signal loss associated with the second optical signal;
comparing, with the processing circuitry, the third value to the sixth value; and
detecting, with the processing circuitry, a condition in the optical network based on the comparing.

12. The method of claim 11, wherein the condition is a fiber bend.

13. The method of claim 11, further comprising receiving, with the processing circuitry, the information from the at least one OLT via a communication network.

14. The method of claim 11, wherein the comparing comprises determining a difference between the third value and the sixth value, and wherein the method further comprises comparing, with the processing circuitry, the difference to a predefined threshold.

15. The method of claim 11, further comprising determining, with the processing circuitry, a location of the condition within the optical network based on the comparing.

16. The method of claim 11, further comprising:
determining, with the processing circuitry, which of the plurality of ONTs are associated with the condition; and
determining, with the processing circuitry, a location of the condition within the optical network based on the ONTs determined to be associated with the condition.

17. The method of claim 11, further comprising determining,
with the processing circuitry, at least one optical component within an optical path between the at least one OLT and the at least one ONT, wherein the determining the second value is based on the at least one optical component.

* * * * *